United States Patent
Boden et al.

[11] 3,877,761
[45] Apr. 15, 1975

[54] ELECTROMAGNETIC BEARING MEANS

[75] Inventors: Karl Boden, Oberteuringen; Dietrich Scheffer, Friedrichshafen, both of Germany

[73] Assignee: Padana AG, Zug, Switzerland

[22] Filed: Mar. 16, 1973

[21] Appl. No.: 342,148

[30] Foreign Application Priority Data
Mar. 20, 1972 Germany............................ 2213465

[52] U.S. Cl. .................................................. 308/10
[51] Int. Cl. ............................................. F16c 39/06
[58] Field of Search ............ 308/10; 74/5.4, 5, 5.47; 73/472, 473

[56] References Cited
UNITED STATES PATENTS

| | | | |
|---|---|---|---|
| 3,146,038 | 8/1964 | Lautzenhiser | 308/10 |
| 3,175,405 | 3/1965 | Doyle | 308/10 |
| 3,238,788 | 3/1966 | Arthur | 308/10 |
| 3,243,238 | 3/1966 | Lyman | 308/10 |
| 3,473,852 | 10/1969 | Lyman | 308/10 |
| 3,493,275 | 2/1970 | Stone | 308/10 |
| 3,565,495 | 2/1971 | Lyman | 308/10 |
| 3,702,208 | 11/1972 | Habermann | 308/10 |

*Primary Examiner*—R. S. Skudy
*Attorney, Agent, or Firm*—Harness, Dickey & Pierce

[57] ABSTRACT

A contact-free bearing system for radially supporting a rotor, rotatable at high speed, with respect to a stationary member comprises a magnetic system including electromagnetic bearings. The electromagnetic bearings includes an endless ferromagnetic core carrying a spiral or toroidal winding which includes or acts as at least three separate coils. Electrical signals, dependent upon the radial deviation in the position of the rotor from a predetermined position are applied to said winding such that the coils produce magnetic fields which are applied to the rotor and are of different magnitude or direction.

14 Claims, 12 Drawing Figures

3,877,761

ELECTROMAGNETIC BEARING MEANS

The present invention relates to an electromagnetic bearing system for supporting a rotor with respect to a stationary member.

Different types of magnetic bearing systems are known. A particularly advantageous contactless magnetic bearing has a stabilisation magnet having an axial magnetic field which is capable of holding the rotor in an axially stable position, that is, it is not necessary to regulate the stabilisation magnet. Further, the bearing includes at least one, but preferably two, radial bearings which counteract radial displacements and oscillations of the rotor at their respective planes. Such a radial bearing, as described in U.S. Pat. No. 3,650,581 may comprise four separate electromagnets, magnetically connected to one another via a ferromagnetic core, and arranged circumferentially of the rotor or may employ a rotating field stator as a radial bearing element.

Both of these known types of magnetic bearings have certain disadvantages. The bearing means including invidivual electromagnets is a complex construction and the dimensions of the bearing as a whole are large. The separate magnetic poles of the electromagnets, distributed around the circumference, produce an inhomogeneous magnetic field in the circumferential direction of the rotor, that is, in the air gap, and this causes eddy current losses and hysteresis losses in the rotating rotor. An arrangement of individual electromagnets has been proposed in which the pole shoes partially surround the rotor, but this arrangement cannot produce a completely homogeneous field. The rotating field stator alleviates most of these disadvantages, but the amount of copper wire required, and thus the cost of the construction, is very high, particularly if the bearing diameter is large in comparison with the bearing forces exerted. One of the advantages of the magnetic bearing is of course that practically no attention need be paid to the shape of the rotor, so that even with light rotor weights large bearing diameters are acceptable. Bearing means constructed as a rotating field stator can therefore have a very small axial length and a relatively large diameter. This however results in extremely large coil winding heads and a very high consumption of copper wire which is increased even more when the winding is a chorded winding.

In connection with electric motors a type of winding has also already been suggested with which essentially toroidal coils are wound on a ferromagnetic core. This type of winding has been little used in practice as such windings have a large dispersion factor and are also inclined to have a pole effect in that they produce a very inhomogeneous magnetic field over their circumference. These windings are for these reasons not accepted by electrical engineers and are now hardly used at all in practice.

It is an object of the present invention to produce an electromagnetic bearing means which can produce a substantially homogeneous magnetic field in the effective air gap between the stator and the rotor, and which only requires a small amount of copper wire and other constructional components.

In accordance with the present invention an electromagnetic bearing means for supporting a rotor with respect to a stationary member comprises an endless ferromagnetic core around which is wound a spiral or toroidal winding which includes or acts as at least three separate coils each adapted to produce in the endless core a magnetic flux of a different magnitude or direction.

It has unexpectedly been shown that contrary to the general opinion in electrical engineering the disadvantages of this type of winding which are so repeatedly emphasised do not have a negative effect if an electromagnetic bearing means of the above-mentioned type is provided with this type of winding. Whilst this type of winding is known to have low efficiency and to produce an inhomogeneous magnetic field due to strong pole formation, this same winding is used here in such a way that a surprising and particularly homogeneous field in produced and the efficiency is outstanding. Furthermore the bearing means of the present invention has the advantage that it can be made with less conductor material than has been previously necessary. If a normal rotating field stator were used for one winding, a large section of the circumference would need to be bridged twice by means of the coil winding head, in the present invention a single coil around the ferromagnetic core is sufficient for the same purpose. The construction of the ferromagnetic core can be particularly simple, and above all no slots etc. are necessary. It can be a smooth core which also permits the use of materials which have special advantages for simple manufacture, for example ferritic pressed materials.

Preferably the output signals, generated by a d.c. electronic controller in response to input signals from a plurality of position sensors, are applied to the winding. Such direct voltage bearings have the advantage that they make it possible to provide a substantially radial premagnetisation magnetic flux in an air gap between the rotor and the core. Whilst the premagnetisation magnetic flux could be set up electromagnetically, it is particularly advantageous if permanent magnets are used as these do not require a power supply and are interference free. The provision of premagnetisation has the advantage of permitting the bearing means to have a very simple construction with the coils distributed evenly about the circumference of the core and having particularly good efficacy. With this form of coil the magnetic field passing radially into the rotor would, without the premagnetisation exert identical attractive forces on both sides of the rotor which is preferably ferromagnetic and not self-magnetic. Because of the premagnetisation, the controlled application of the signals to the winding has the effect of weakening the magnetic field at one side of the rotor and strengthening the magnetic field at the other side so that a positive influence on the rotor is achieved.

A bearing means not utilizing premagnetisation may be used. Preferably, a first of each of two pairs of coils extends over a larger section of the circumference of the endless core than the other core of each pair, whereby each pair of coils produces a magnetic field passing asymmetrically through the rotor. Thus the magnetic field enters the rotor over a relatively small section of the rotor. A definite force influence is thereby exerted on the rotor.

Preferred embodiments of the present invention will hereinafter be described with reference to the accompanying drawings, in which.

Figure 1:
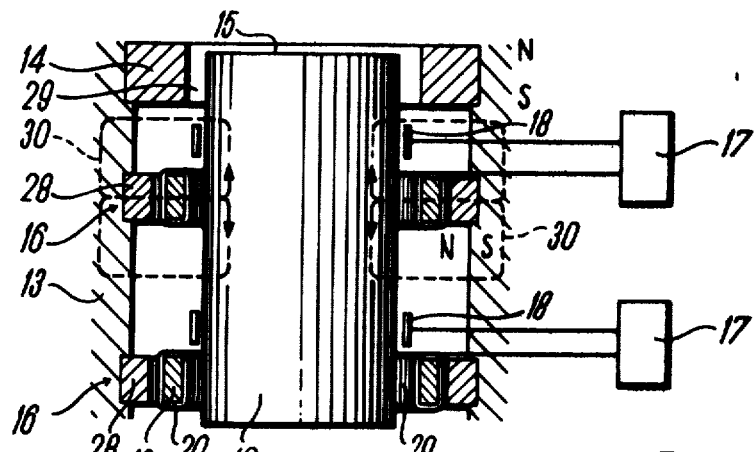
FIG. 1 shows schematically a longitudinal section through bearing means in accordance with the invention.

FIG. 1 shows a longitudinal section through part of a rotor 12 which is journalled in a stator 13 by magnetic bearings. The rotor 12 is shown as a cylindrical ferromagnetic part and can comprise, for example, a simple steel tube. Of course the rotor 12 will have a form which is appropriate for any particular application. However, it is important that the configuration of the rotor should not be determined by the requirement that the rotor should be journalled. It is also important that the bearings should be effective in zones of relatively large circumference.

The rotor 12 is held stable in the axial direction by an annular axial stabilisation magnet 14 which is a permanent magnet magnetized in the axial direction and is also referred to as a carrier magnet. The rotor 12 is axially located so that its top end surface 15 lies in the magnetic field of the carrier magnet and the axial components of the magnetic field of the carrier magnet hold the rotor in this position. The rotor 12 is only stabilised in axial direction by the magnetic field of the carrier magnet 14. However, the magnetic field of the carrier magnet 14 also has a radial component which has a strong destabilising effect on the rotor 12, that is, the magnetic field of the carrier magnet 14 continuously tends to move the rotor 12 against the carrier magnet 14.

The destabilizing effect of the carrier magnet 14 on the rotor 12, and all other forces and oscillations acting on the rotor 12 in the radial direction, are opposed by bearing means 16 which are mounted in the zones of the top and bottom ends of the rotor 12. The carrier magnet 14 and the bearing means 16 are fixed to the stator 13. The bearing means 16, the construction of which will be described in more detail below, produce, by electromagnetism, magnetic forces which act on the ferromagnetic rotor 12 (or on its ferromagnetic parts). The bearing means 16 are each supplied with output signals from a respective controller 17, these output signals being transmitted by the controller 17 as a function of signals from sensors 18 which are mounted around the circumference of the rotor 12 and which respond to displacements of the rotor 12. This arrangement of sensors provides a contactless pick-up system for the displacement of the rotor 12. There are four sensors 18 in each bearing plane, each bearing plane being represented by one bearing means 16. The rotor 12 is regulated in two radial directions perpendicular to one another, forces having to be exerted in two orientations for each direction, since with the ferromagnetic rotor used only pull forces can be applied. It would also be possible to provide only two sensors since sensors which are mounted opposite one another supply signals which have opposite directions but which are otherwise identical. Control in a total of four directions of pull is particularly simple and also permits a particularly simple construction of the controller 17. It would also be possible in principle to provide a different number of controlled directions of pull, although there must be at least three.

Figure 2:
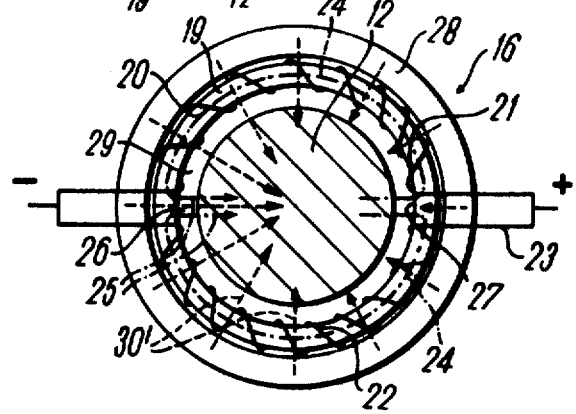
FIG. 2 shows schematically a cross-section through the bearing means of FIG. 1.

The basic design of the bearing element in conformity with the invention is shown in FIG. 2. From this can be seen that the rotor 12 is surrounded by an annular core 19 made of ferromagnetic material. The core 19 can consist of standard materials used for alternating magnetic fields, e.g. ferritic pressed material, dynamo sheet, or similar. It has however become evident that even at extremely high rotor speeds ordinary commercial types of engineering steel could be used perfectly well as material for the annular core 12. The axial dimensions of the annular core 19 are considerably smaller than the diameter and the core 19 is provided with a winding 20. This winding 20 surrounds the annular core 19 and is in the form of a spiral coil. Although the cross-section of the annular core 19, as can be seen from FIG. 1, is essentially rectangular, the winding 20 is approximately toroidal in shape. The individual winding sections of the winding 20, which are separately wound or are formed by tapping a continuous winding, are shown as coils. In FIG. 2 there are two coils 21 and 22, which are wound around the top and bottom halves of annular core 19 respectively.

Adjacent connections 23 of the two coils 21 and 22 are electrically connected with one another and are each connected to one output of controller 17 so that output signals from the controller 17 are applied to the connections 23. In the embodiment shown in FIG. 2, the coils 21 and 22 of winding 20 are wound in the same direction, and the winding 20 is wound around the entire annular core 19. Obviously different winding directions could be used for the two coils 21 and 22. The polarity of the coils would then be correspondingly different. Coils 21 and 22 are connected so that a magnetic flux is produced in the annular core 19 as indicated by dash-dot line 24. The flux produced in the annular core 19 is counterclockwise in the zone of top coil 21 and clockwise in the zone of bottom coil 22. These two magnetic fluxes are directed towards or away from one another between the two coils 21, 22 and because of the field displacement so caused form magnetic poles 26 and 27. The magnetic flux therefore flows into the rotor 12 from the annular core 19 at pole 26 and flow from the rotor 12 into the annular core 19 at pole 27, as indicated by arrow 25.

The annular core 19 together with its winding 20 is surrounded by a permanent magnet 28. The magnet 28 is a radially magnetised magnet so that, as can be seen from FIG. 1, the magnetic flux of the magnet 28 flows through the annular core 19. An air gap 29 between the annular core 19 and the rotor 12 is in the magnetic field 30 of the magnet 28. The magnetic flux of the field 30 flows radially through the air gap 29 and then diverges axially in the rotor 12 and returns to the stator 13 via the air gap 29. In the drawings the magnetic field 30, which is a premagnetisation field, is indicated by dash lines, whilst the control magnetic field 24, 25 produced by the winding 20 is indicated by dash-dotted lines.

If the control magnetic field 24, 25 were present alone, that is, if there were no premagnetisation field 30, a force effect on a ferromagnetic, but not self-magnetic, rotor would not be possible, since the exclusively attractive forces which can be exerted on the rotor 12 would be of identical magnitude but in opposite directions in the zone of poles 26 and 27. In the arrangement shown having the premagnetisation field 30, the premagnetisation field 30 is modified by the superposition of the control magnetic field 24, 25 in such a way that the premagnetisation field 30 is strengthened in the zone of pole 26 and weakened in the zone of pole 27. This is indicated in FIG. 2 by the lengths of the arrows 30' indicating the direction and strength of the premagnetisation field 30. If the direction of current flow in the coils 21 and 22 is reversed, the magnetic flux 24 in the annular core 19 is also reversed and the strength of the magnetic field at pole 27 is increased so that the rotor 12 is pulled by the magnetic field at pole 27.

The bearing means shown in FIG. 2 permits control of the rotor 12 in two of the four orientations described above. For control in the other two orientations, in this embodiment, vertical orientations, either a second bearing means 16 is mounted offset at 90° on the cross-sectional plane, or another winding offset by 90° is wound on the same annular core 19.

Figure 3:
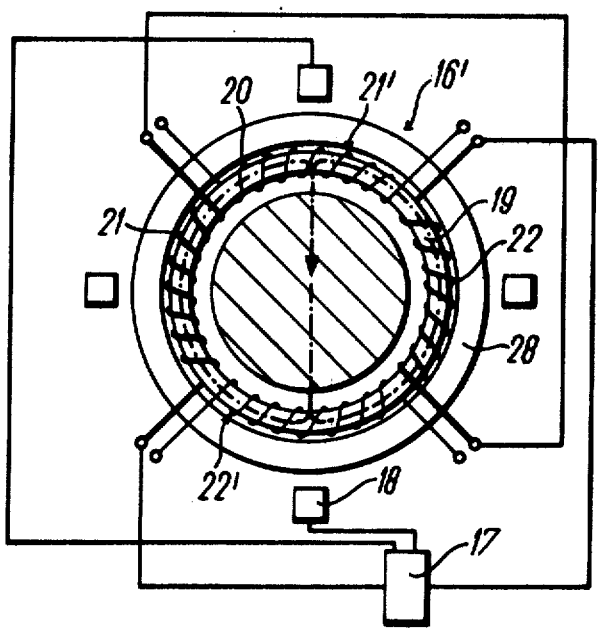
FIG. 3 shows schematically a cross-section through a further embodiment of bearing means of the present invention.

In FIG. 3 a particularly advantageous embodiment of a bearing means 16' is shown. The arrangement shown in FIG. 3 is substantially identical to that shown in FIG. 2 except that the winding 20 comprises four coils 21, 22, 21' and 22'. The coils 21, 22, 21' and 22' each cover a quarter of the circumference of the annular core 19. Coils 21 and 22 are paired, are mounted opposite one another and are connected to the appropriate outputs of the controller 17. In a similar manner coils 21' and 22' are mounted opposite one another and are connected to appropriate outputs of the controller 17. For clarity, only the circuit of coils 21 and 22 is shown in FIG. 3, and these coils are drawn more boldly. The winding and connection of the pair of coils 21' and 22' is similar to that of the pair of coils 21 and 22.

It can be seen that in the embodiment shown in FIG. 3, having a single layer winding 20 on the annular core 19, it is possible to provide a bearing means which permits control of the rotor in all four orientations. The arrangement shown, in which one quarter of the circumference of annular core 19 is between each of the two paired coils 21 and 22 or 21' and 22', ensures particularly good homogeneity of the magnetic field. "Poles" are created which have an outstandingly broad-surface effect, i.e. covering together half the circumference of the bearing means, and with a correspondingly low eddy current loss and hysteresis loss in the rotor 12.

In the embodiment shown in FIG. 3, the two coils 21 and 22 are connected in series. They can, however, as shown in FIG. 2, be connected in parallel.

Figure 4:
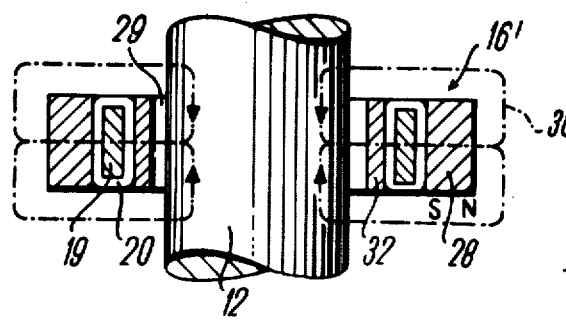
FIGS. 4 to 7 show schematically longitudinal sections through further embodiments of bearing means being premagnetized.
Figure 5:
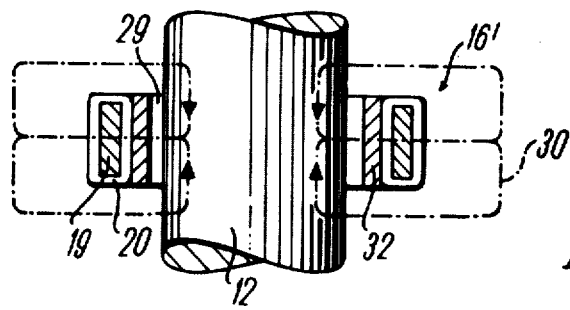

FIGS. 4 to 7 show different arrangements of the permanent magnet 28 for producing the pregmagnetisation field 30. In the embodiments shown in FIGS. 4 to 7 the winding and annular core of the bearing means is substantially as described above. FIG. 4 shows an arrangement in which, in addition to the external radially magnetised annular permanent magnet 28, as shown in FIGS. 1 to 3, an inner, annular permanent magnet 32 which is also radially magnetised is provided. The radial dimensions of the inner magnet 32 are relatively small. Thus, in this embodiment, the annular core 19 and the winding 20 are substantially enclosed between the inner and outer permanent magnets 28 and 32. In the embodiment shown in FIG. 5 only the inner permanent magnet 32 is provided. The direction of magnetization of the permanent magnets is, unless otherwise indicated, shown in each case by the dash-dotted flux lines 30. The inner permanent magnet 32 is immediately adjacent to the effective air gap 29 and this arrangement offers the advantage of extremely efficient use of the permanent magnetic material, with, however, a larger effective air gap for the control magnetic field. With the arrangement of the annular core and winding as a component adjacent to the air gap, the thickness of the winding itself and of the permanent magnet must be related to the air gap. It has been shown that a larger air gap is not always disadvantageous, but that it can also be an advantage as it contributes to the homogenisation of the magnetic field.

Figure 6:
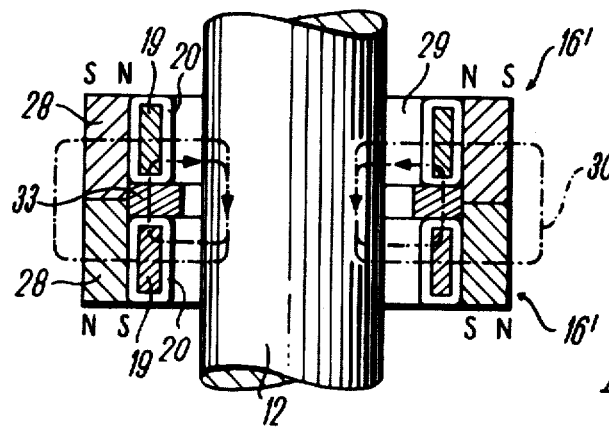

FIG. 6 shows a coaxial arrangement of two essentially identical bearing means 16'. The premagnetisation field 30 is produced, in this embodiment, by means of two radially magnetised permanent annular magnets 28, which have opposite directions of magnetisation. The magnetic flux pattern indicated by the dash-dot line 30 is produced. The magnetic field 30 is reinforced by an axially magnetised, annular magnet 33 mounted between the two bearing means 16'. This embodiment also permits efficient use of the permanent magnetic material to be made, particularly by the axially magnetised annular magnet 33, in that stray magnetic flux is reduced and thus that the effective magnetic field of the permanent magnet 33 is strengthened.

Figure 7:
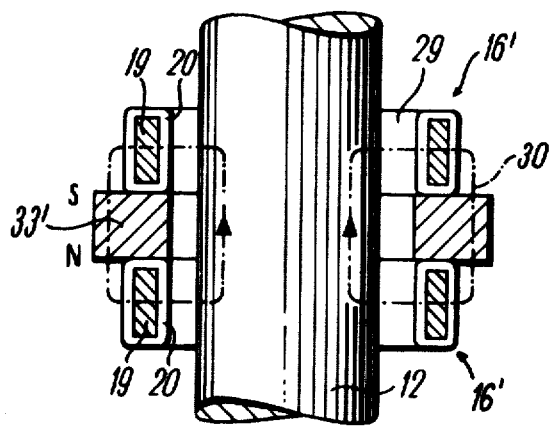

FIG. 7 shows a premagnetisation field 30 set up by means of an axially magnetised permanent annular magnet 33'. The flux path of the magnet 31' is similar to that of permanent magnet 33 shown in FIG. 6. The flux path of the magnet 31' passes through bearing means 16' mounted above and below the magnet 38', and passes axially in the rotor 12. The flux path is thus a closed loop as shown in FIG. 7. One of the two bearing means could be omitted, in which case a further ferromagnetic element could be provided to improve the return flux path.

It is also possible to use annular magnet 33' as a carrier magnet, in which case the rotor 12 must have a heel or one end of its ferromagnetic section in the zone of the magnet 33'. It should be noted that the premagnetisation magnetic field 30 can have both a carrying and an axially damping effect. Whilst the premagnetisation magnetic field 30 should be circumferentially as completely homogeneous and uniform as possible, in order to produce no magnetic hysteresis losses when the rotor 12 rotates, the premagnetisation field 30 always has a gradient in the axial direction, so that axial oscillation of the rotor 12 due to magnetic hysteresis loss is damped as required.

Figure 8:
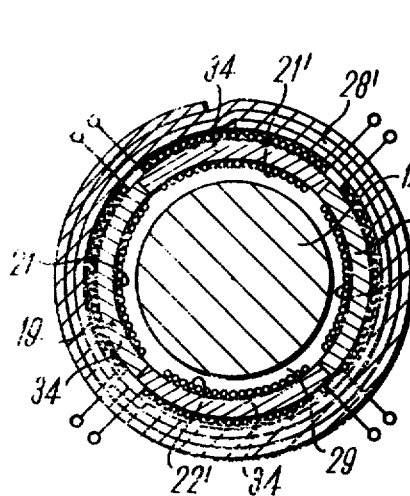
FIG. 8 shows schematically a cross-section through further bearing means in accordance with the invention.

FIG. 8 shows a cross-section through a bearing means which has a basic construction identical to that shown in FIG. 3. In this embodiment, however, the annular core 19 is made up of four segments 34 of identical size and shape. It is much easier to fit such segments with windings than it is to wind a closed ring. Each of the segments 34, is provided with one of the coils 21, 22, 21' or 22'. All four segments 34 can be identical. It is important to join the segments 34 together to form the annular core 19 in such a way that the magnetic flux in the annular core 19 is not impeded. The end surface of each segment 34 must therefore be machined to give a firm fit to avoid any significant air gap between segments. It is also possible to mesh the individual segments together by means of teeth.

The premagnetisation is produced by a radially magnetised permanent magnet 28', which consists of a plastically malleable strip of permanent magnetic material wound around the annular core 19.

Figure 9:
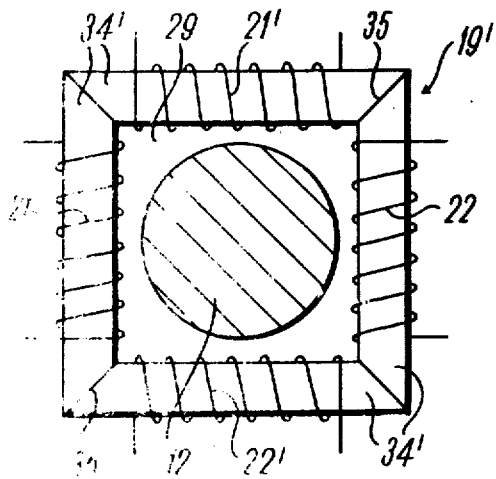
FIG. 9 shows schematically a cross-section on a bearing plane.

FIG. 9 shows schematically an embodiment of the invention in which an endless core 19' comprises sections 34' which are not circular segments as shown in FIG. 8, but which are straight sections provided with bevels 35. The sections 34' are wound with the coils 21, 22, 21' and 22'. The core 19' is made up of the individual sections 34' to form a square frame. The four straight sections 34 can be wound on a standard winding machine and are joined together to form the frame only after they have been wound. This embodiment results in a very large air gap between the rotor 12 and the core 19', at least in parts, but by appropriate winding good homogeneity of the magnetic field and a high degree of efficiency can be obtained.

Figure 10:
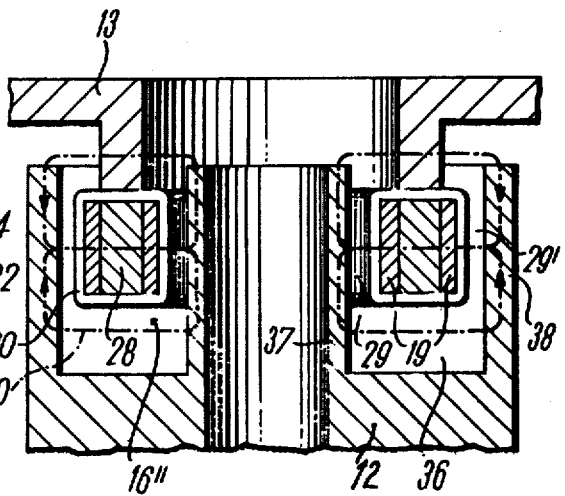
FIG. 10 shows schematically a longitudinal section through bearing means together with a section of the rotor.

FIG. 10 shows a bearing means which is a combination of an internal bearing with an external bearing. The rotor 12 is provided at its top end with an annular recess 36 which is defined internally and externally by ferromagnetic wall-sections 37 and 38 respectively. A bearings means 16' mounted on the stator 13, projects into the recess 36 from above. Bearing means 16" comprises a radially magnetised annular magnet 28 which is located centrally between two ferromagnetic rings which together form annular core 19. The winding 20 is wound around the composite core which consists of the two ferromagnetic rings and the permanent magnet 28. In this embodiment two effective air gaps 29 and 29' are produced, one internal of, and the other external of the composite core. The flux of premagnetisation field 30 flows radially in the two air gaps, and the magnetic control flux, produced due to flux displacement in the bearing means 16" weakens the field 30 in one air gap and strengthens the field 30 in the other air gap.

The magnetic flux at the cylindrical coil surfaces flows exclusively radially through the air gaps, and therefore produces an optimal ratio of effective magnetic flux to stray magnetic flux. From a constructional point of view the embodiment shown in FIG. 10 is particularly simple particularly when compared with the two separate bearing means which would otherwise be required. The permanent magnet 28 can, as with the other embodiments, be made of a pressed material. Thus the embodiment shown in FIG. 10 can be produced quite simply by placing magnetic material in powder form between two ferromagnetic rings, the powdered magnetic material then being compressed between these rings to produce the permanent magnet 28.

Figure 11:
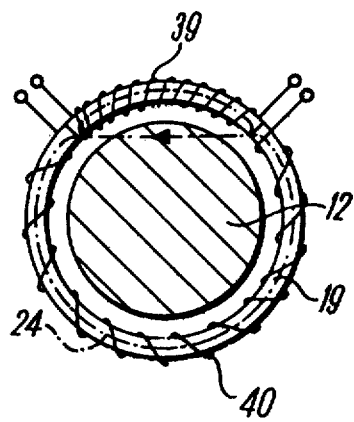
FIG. 11 shows schematically a cross-section through a part of a bearing means.

FIG. 11 shows a schematic view of an embodiment of a bearing means in which it is not necessary to provide premagnetisation. FIG. 11 shows only one layer of the winding on annular core 19, that is, coils 39, 40. The coils 39 and 40 control the rotor 12 in one direction, in this instance, vertically upwards. To obtain a complete bearing at the bearing plane at least three, preferably four, such windings are provided appropriately offset with respect to one another.

The coils 39 and 40 are mounted on a ferromagnetic annular core which may be identical to the core 19 described hereinbefore. The coils 39, shown at the top in FIG. 11, has the same number of turns as coil 40, but is mounted on a considerably smaller section of the circumference of the annular core 19 than is coil 40. In the example shown in FIG. 11, coil 39 occupies approximately one-quarter of the circumference of the core 19 whilst coil 40 occupies three-quarters of the circumference thereof. In the zone of the joints between the two coils 39 and 40 the magnetic flux passes out of annular core 19, passes through the rotor 12, and returns to the core 19 in the zone of the other joint between the coils 39 and 40. This provides a bearing means which can exert a pull on the rotor force in a predetermined direction without a premagnetisation magnetic field. The windings necessary for the other directions of force can also be mounted on the annular core 19.

The winding shown in FIG. 11 is also suitable for AC voltage bearings. The windings may be connected so that in a predetermined position of the rotor axis all AC fields in the annular core are balanced so that the AC fields do not produce, either in the annular core or in the rotor material magnetic reversals or eddy currents which would result in heat being generated and an impairment of the energy balance of the electromagnetic bearing. Only when a displacement of the rotor occurs are the bearing coils affected by unequal AC fields which have a direct effect on the rotor to pull it into the balanced position. In this case magnetic reversals may take place in the annular core as is the case with known types of AC voltage bearings.

There are a great number of other possible embodiments of the present invention over and above those shown and described hereinbefore. It has already been pointed out that any one of a number of materials may be used for the annular core, for example, normal steel, dynamo sheet, or highly permeable ferritic pressed materials. Highly permeably ferritic pressed materials reduce eddy currents in the case of high control signals and have high limit frequencies. It has been shown that possible inhomogeneities in the magnetic field in which the rotor runs can be reduced to a minimum by varying the shape of the annular core slightly from the accurately circular form. It has been shown that the somewhat larger air gaps which result also contribute to the homogeneity of the magnetic field. Identical results can also be obtained by modifying the cross-section of the annular core or by varying the winding density. Among the above-mentioned inhomogeneities are magnetic flux paths which are set up along the circumference of the effective air gap and which result in losses in the rotor. These circumferential magnetic flux paths are greater than those necessary for control reasons. Coil length is proportional to bearing diameter with a comparable winding distribution. It can be seen from this that with larger bearing diameters which always cause difficulties with known types of bearings a given magnetic field intensity can be produced by a smaller number of winding layers on a coil. The bearing means of the present invention are therefore particularly advantageous for bearings with very large bearing diameters. The setting up of the premagnetisation can be carried out electromagnetically, but the possibility of using permanent magnets for this offers considerable advantages since these require no power and are free from interference in operation. It has already been pointed out that the bearing means of the present invention can also be used as an AC voltage bearing means. It is possible to compensate for alternating magnetic fields, which are produced in all coils by stationary AC currents and do not contribute to the stabilisation of the rotor, by appropriate connection of the individual coils so that when the rotor is in the required position hysteresis and eddy currents are not produced either in the rotor or in the stator (annular core). This eliminates a great disadvantage of AC bearings used hitherto.

In the case of bearing means operating with premagnetisation, the resultant magnetic forces acting on the rotor in the case of large air gaps are approximately proportional to the product of the induction produced by the premagnetisation and the induction produced by the annular core having a winding in the same air gap. If the premagnetisation is set up using a permanent magnet, and if the controller and coil data are constant so that the power output is constant, the maximum magnetic carrying force of the bearing means and its magnetic elasticity constant can be varied between wide limits. By appropriate dimensioning of the permanent magnet the carrying force can be increased without an increased power requirement. If strong premagnetisation is used, magnetic forces may be produced which are strong enough for many applications even if large air gaps are present.

It is also possible to have a grooved annular core. This results in a reduction of the air gap between the annular core. and the rotor, but it also results in a ripple effect of the magnetic field along the air gap and thus in increased inhomogeneity. This modification is therefore only suitable in particular embodiments.

The bearing means described can also be used when controllers other than those described above are employed. For example, DC controllers which amplify the signals from the sensors and transmit them with a phase-lag to the bearing means may be used. A further type of controller modifies the action time of a current of constant amplitude on the bearing means as a function of rotor position. Such controllers are also known as electronic DC regulating units. The magnetic fields of the neutral currents necessary in this case are compensated by corresponding connection of the winding so that the homogeneity of the bearing is not impaired. The bearing means of the present invention can be used not only as an external bearing, that is, surrounding the rotor, but also as an internal bearing, that is, within the rotor section.

Figure 12:
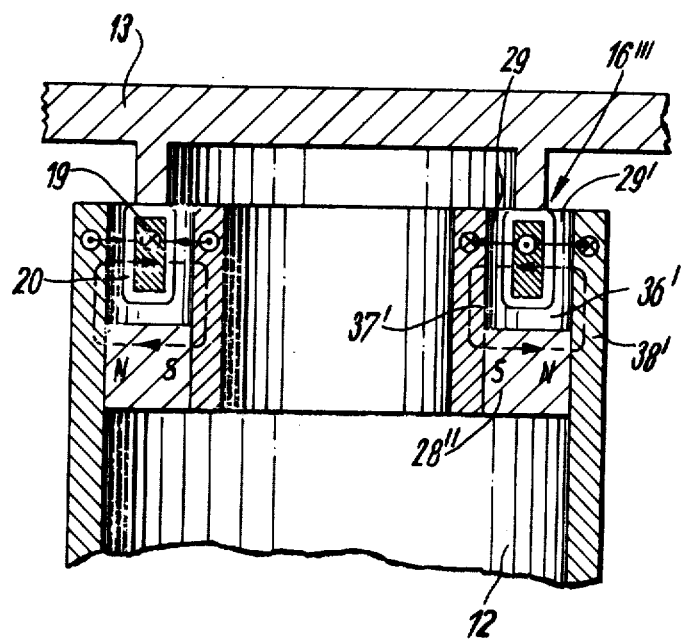
FIG. 12 shows schematically a longitudinal section through a further embodiment of bearing means of the present invention.

FIG. 12 shows an embodiment in which, as in the example shown in FIG. 10, a bearing means 16''' is mounted on a stator 13 and received in a recess 36' in the end surface of the rotor 12. The bearing means comprises a ferro-magnetic core 19 and a winding 20 wound around it. The axial length of the bearing means 16''' is larger than the radial thickness thereof, as is the case in the embodiments described hereinbefore.

A permanent annular magnet 28'' is mounted on the rotor 12 between an outer rotor wall 38' and a wall 37' defining the process 36'. The magnet 28'' is radially magnetised. The walls 37' and 38' of the rotor 12 form not only a good mechanical support for ceramic magnet materials which are generally not very strong, but also form pole shoes which conduct the magnetic field to the air gaps 29 and 29' between the rotor walls and the coils of the bearing means 16'''. As can be seen from the dashed lines and arrows in FIG. 12, in each left-hand air gap 29 on each side the magnetic flux of the permanent magnet 28'' and the magnetic control flux produced by the bearing means 16''' are in the same direction. This provides a stronger force in each left-hand gap 29 than in the respective right-hand gap 29' so that the rotor is pulled to the right in the control stage shown in FIG. 12.

It is not essential to have the permanently magnetic parts of the present invention mounted on the rotor. Normally, and particularly at high speeds, it is disadvantageous to mount a permanent magnet on the rotor since magnetic materials do not usually possess very great mechanical strength. They also increase the weight of the rotor. In particular applications, for example with low speeds or with a rotor weight which must be heavy due to inertia factors, the embodiment shown in FIG. 12 can offer advantages. In comparison with the embodiment shown in FIG. 10, for example the coil of bearing means 16'' can be made smaller in the radial direction, since the inner permanent annular magnet is not present. The required wire length for winding 20 is thus smaller, which furthermore results in a reduction of the ohmic resistance of the bearing element. The permanent annular magnet does not need to be adapted to the shape of the bearing coil, and higher volumes of permanent magnetic material can be used without constructional difficulties.

Embodiments in which permanent magnets are mounted on the rotor are not restricted to the example shown in FIG. 12. For example one of the ferromagnetic walls 37' or 38' forming the pole shoes can be eliminated. This would eliminate the double air gap, but the operation would remain substantially the same.

We claim:

1. In a magnetic bearing system for journalling a rotor radially about a rotor axis with respect to a stationary member, said rotor comprising at least a ferromagnetic portion: electromagnetic bearing means disposed on the stationary member adjacent said rotor ferromagnetic portion, means for sensing radial deviations of the position of the rotor from a predetermined position and adapted to produce electrical output signals in accordance with said deviations, said electromagnetic bearing means comprising an endless ferromagnetic core extending in a generally circumferential direction relative to said rotor axis and carried by said stationary member, and a winding wound about said endless ferromagnetic core the individual turns of said winding extending generally around cross sections of said core taken in planes containing said rotational axis, said winding comprising at least three coil portions connected to receive said electrical output signals whereby said winding produces at least three different magnetic fields to which the rotor is subjected.

2. A magnetic bearing system according to claim 1, in which said sensing means comprises at least three contactless sensors for producing electrical control signals in accordance with radial deviations of the position of the rotor from the predetermined position, and an electronic control device adapted to produce said output signals in response to said control signals.

3. A magnetic bearing system according to claim 2, further comprising premagnetization means for producing a magnetic flux between said rotor and said stator and extending substantially radially with respect to the rotor.

4. A magnetic bearing system according to claim 3 in which said premagnetization means comprises at least one permanent magnet.

5. A magnetic bearing system according to claim 4, in which said permanent magnet comprises coiled flexible, permanently magnetized material.

6. A magnetic bearing system according to claim 2, in which said winding comprises four coils arranged uniformly over the circumference of the endless core.

7. A magnetic bearing system according to claim 6, in which each of said four coils extends over one-quarter of the circumference of said endless core.

8. A magnetic bearing system according to claim 7, in which each pair of opposite coils is connected to receive respective output signals from said electronic control device.

9. A magnetic bearing system according to claim 2, in which said winding comprises a plurality of pairs of coils, a first coil of each pair extending over more than half the perimeter of the core, and a second coil of each pair extending over less than half the perimeter of the core, whereby said first and second coils produce an asymmetrical magnetic field within the rotor.

10. A magnetic bearing system according to claim 1, in which said ferromagnetic core comprises a plurality of sections, each section carrying a respective coil of said winding.

11. A magnetic bearing system according to claim 1, in which said ferromagnetic core comprises four sections each forming a quarter of the core and said winding comprises four coils, one on each core section.

12. A magnetic bearing system according to claim 1 in which said ferromagnetic core comprises ferritic pressed material.

13. A magnetic bearing system according to claim 2, in which said rotor ferromagnetic portion has first and second surfaces, and said bearing means is disposed radially externally of said first surface and radially internally of said second surface.

14. A magnetic bearing system according to claim 4, in which said permanent magnet is disposed on said rotor.

* * * * *